United States Patent
Kim et al.

(10) Patent No.: US 10,326,976 B2
(45) Date of Patent: Jun. 18, 2019

(54) METHOD AND APPARATUS FOR PROVIDING PERSONAL 3-DIMENSIONAL IMAGE USING CONVERGENCE MATCHING ALGORITHM

(71) Applicant: INDUSTRY-ACADEMIC COOPERATION FOUNDATION, YONSEI UNIVERSITY, Seoul (KR)

(72) Inventors: Shi Ho Kim, Incheon (KR); Sang Ho Lee, Incheon (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 56 days.

(21) Appl. No.: 15/624,888

(22) Filed: Jun. 16, 2017

(65) Prior Publication Data

US 2017/0366797 A1 Dec. 21, 2017

(30) Foreign Application Priority Data

Jun. 17, 2016 (KR) .................. 10-2016-0075983
Jun. 13, 2017 (KR) .................. 10-2017-0073863

(51) Int. Cl.
*H04N 13/00* (2018.01)
*H04N 13/128* (2018.01)
(Continued)

(52) U.S. Cl.
CPC ......... *H04N 13/128* (2018.05); *H04N 13/144* (2018.05); *H04N 13/344* (2018.05); *H04N 2213/002* (2013.01)

(58) Field of Classification Search
CPC ......... H04N 13/0022; H04N 2213/002; H04N 13/344; H04N 13/128; H04N 13/00;
(Continued)

(56) References Cited

U.S. PATENT DOCUMENTS 9,507,165 B2 * 11/2016 Ueda .................. G02B 27/2228
2010/0039502 A1 * 2/2010 Robinson ................ G06T 15/20
348/47

(Continued)

FOREIGN PATENT DOCUMENTS

JP 2011-205195 A 10/2011

OTHER PUBLICATIONS

Communication dated Feb. 20, 2018, issued by the Korean Patent Office in counterpart Korean Application No. 10-2017-0073863.

*Primary Examiner* — Xilin Guo
(74) *Attorney, Agent, or Firm* — Sughrue Mion, PLLC

(57) ABSTRACT

Disclosed herein are a method and apparatus for providing a personalized three-dimensional (3D) image. The apparatus for providing a personalized three-dimensional image using convergence matching may include a fixed screen set as a horopter region, a calculation unit configured to calculate a shift value of an image projected onto the screen based on a distance from a virtual stereo camera to a target object, a convergence matching unit configured to match a convergence angle to the horopter region based on the shift value, and a controller configured to control the convergence matching unit to maintain the convergence angle when a user's gaze is shifted to a nearby object having the same depth value as the target object.

12 Claims, 16 Drawing Sheets

(51) Int. Cl.
*H04N 13/344* (2018.01)
*H04N 13/144* (2018.01)

(58) Field of Classification Search
CPC ............. H04N 13/144; G02B 27/0075; G02B 27/0093; G02B 27/01; G02B 27/2278; G02B 7/105
See application file for complete search history.

(56) References Cited

U.S. PATENT DOCUMENTS

| | | | | |
|---|---|---|---|---|
| 2014/0293022 | A1* | 10/2014 | Okamoto | H04N 13/0033 348/51 |
| 2016/0026243 | A1* | 1/2016 | Bertram | G06F 3/013 345/156 |
| 2017/0023801 | A1* | 1/2017 | Hyde | A61B 3/113 |
| 2017/0171534 | A1* | 6/2017 | Kondiparthi | H04N 13/349 |

* cited by examiner

METHOD AND APPARATUS FOR PROVIDING PERSONAL 3-DIMENSIONAL IMAGE USING CONVERGENCE MATCHING ALGORITHM

CROSS-REFERENCE TO RELATED APPLICATION

This application claims priority to and the benefit of Korean Patent Application No. 10-2017-0073863, filed on Jun. 13, 2017, and Korean Patent Application No. 10-2016-0075983, filed on Jun. 17, 2016, the disclosure of which is incorporated herein by reference in its entirety.

BACKGROUND

1. Field of the Invention

The present invention relates to a method and apparatus for providing a personalized three-dimensional (3D) image, and more particularly, to a method and apparatus for providing a personalized 3D image capable of reducing visual fatigue using a convergence matching algorithm. Here, the personalized 3D image providing apparatus may be a one-person imaging apparatus such as, for example, a head-mounted display (or helmet mounted display, HMD) or a head-worn display (HWD).

2. Discussion of Related Art

Recently, the industry related to virtual reality is emerging as a hot topic. If a part which the user is focusing on in content is known, technology that allows the user to concentrate on that part and to focus thereon will become one of the most necessary technologies for game companies in distributing virtual reality head-mounted displays (VR HMDs) capable of tracking eyes in future.

The demand for visual fatigue reduction techniques is expected to be very high in personalized 3D image providing apparatuses.

One of the key issues that may determine the rise and fall of VR is dizziness caused by visual fatigue for viewing the 3D image. Therefore, if visual fatigue can be reduced through a convergence matching algorithm within the VR HMD, this will help resolve dizziness.

The conventional technology has failed to address the keystone effect, which is a typical issue that occurs when a virtual camera is tilted by an angle.

Wherein, the keystone effect is the apparent distortion of an image caused by projecting it onto an angled surface. It is the distortion of the image dimensions, such as making a square look like a trapezoid, the shape of an architectural keystone, hence the name of the feature.

SUMMARY OF THE INVENTION

It is an object of the present invention to provide a convergence matching algorithm suitable for a personalized three-dimensional image providing apparatus.

It is another object of the present invention to provide a convergence matching algorithm that addresses the keystone effect, thereby lessening visual fatigue.

In accordance with an aspect of the present invention, the above and other objects can be accomplished by the provision of an apparatus for providing a personalized three-dimensional image using convergence matching, the apparatus comprising a fixed screen set as a horopter region; a calculation unit configured to calculate a shift value of an image projected onto the screen based on a distance from a virtual stereo camera to a target object; a convergence matching unit configured to match a convergence angle to the horopter region based on the shift value; and a controller configured to control the convergence matching unit to maintain the convergence angle when a user's gaze is shifted to a nearby object having the same depth value as the target object.

The apparatus may further include a blurring processor configured to set a range within a predetermined distance from the horopter region as Panum's area and perform blurring on a focus of an area outside the Panum's area.

The calculation unit may calculate a screen disparity value d formed on the screen by the virtual stereo camera and the target object, and calculates a positive shift value when a depth value of the target object is greater than a depth value of the screen, and a negative shift value when the depth value of the target object is less than the depth value of the screen.

The positive shift value may be d/2, and the negative shift value may be −d/2.

The horopter region may be obtained by modeling a human eye horopter having a form of a curve into a straight line having a predetermined distance from human eyes.

The apparatus may further include a correction processor configured to calculate a focal length from the virtual stereo camera to the target object and an object distance from the virtual stereo camera to the target object, and correct a perspective and a focus within content for three-dimensional display using the focal length and the object distance.

The apparatus may further include an eye-tracking unit configured to calculate three-dimensional coordinates using eye information acquired by eye-tracking the user and extract an eye focal length corresponding to the three-dimensional coordinates, wherein the controller controls the calculation unit to calculate the shift value based on the eye focal length.

The eye-tracking unit may acquire, as the eye information, a two-dimensional coordinate on the screen monitored by the user through eye-tracking of the user, and may extract the eye focal length by calculating a distance between a calculated value of the two-dimensional coordinate and the virtual camera.

When the user's gaze is shifted to an object having a depth value different from the depth value of the target object, the controller controls determines whether to maintain the convergence angle based on an attribute of the object.

In accordance with another aspect of the present invention, a method of providing a personalized three-dimensional image using convergence matching, comprises setting a fixed screen of a personalized three-dimensional image providing apparatus as a horopter region; calculating a shift value of an image projected onto the screen based on a distance from a virtual stereo camera to a target object; matching a convergence angle to the horopter region based on the shift value; and controlling the personalized three-dimensional image providing apparatus to maintain the convergence angle when a user's gaze is shifted to a nearby object having the same depth value as the target object.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

The embodiments of the present invention are described with reference to the accompanying drawings and the description thereof but are not limited thereto.

The terminology used in the present disclosure serves the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "includes" and/or "including," when used in this specification, specify the presence of stated features, steps, operations, elements, and/or components, but do not preclude the presence or addition of one or more other features, steps, operations, elements, components, and/or groups thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

Further, as used in the description of the invention and the appended claims, the singular forms "a", "an" and "the" are intended to include the plural forms as well, unless context clearly indicates otherwise.

In addition, terms such as "first" and "second" in the specification and the appended claims are used herein merely to describe a variety of constituent elements, but the constituent elements are not limited by the terms. The terms are used only for the purpose of distinguishing one constituent element from another constituent element.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Meanwhile, in the following description of the present invention, a detailed description of known functions and configurations incorporated herein will be omitted when it may make the subject matter of the present invention unclear. The terms used in the specification are defined in consideration of functions used in the present invention, and can be changed according to the intent or conventionally used methods of clients, operators, and users. Accordingly, definitions of the terms should be understood on the basis of the entire description of the present specification.

Figure 1A:
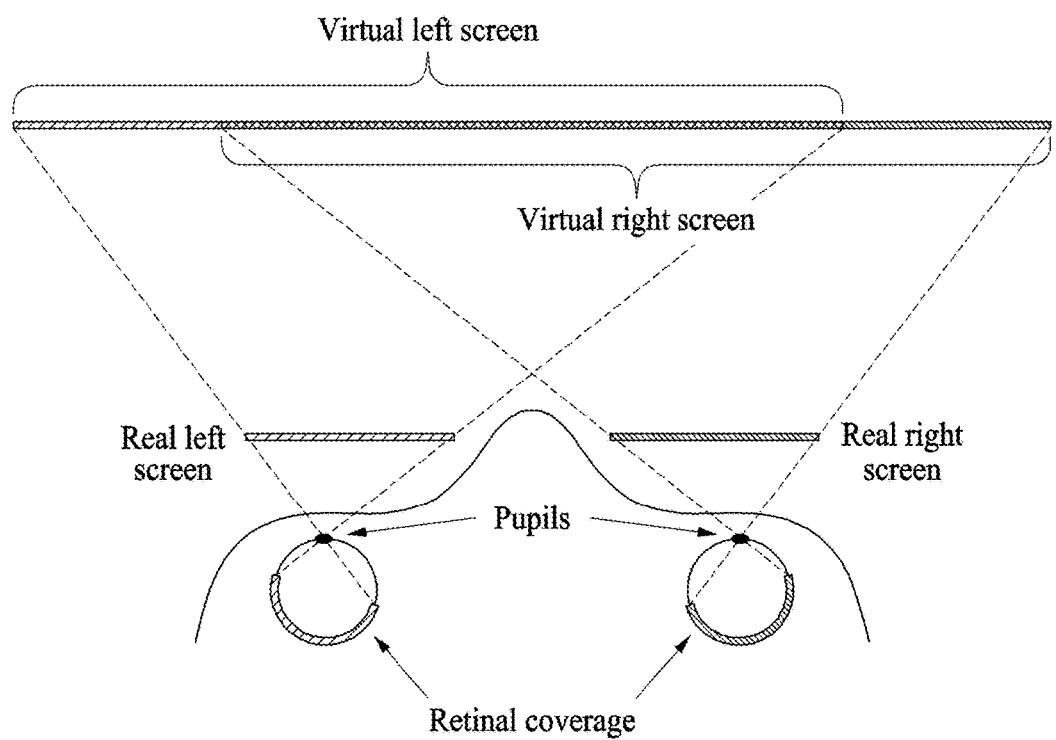
FIGS. 1A to 1C are views for providing an overview of image technology of a 3D personalized image providing apparatus using a stereo technique according to the related art.
Figure 1B:
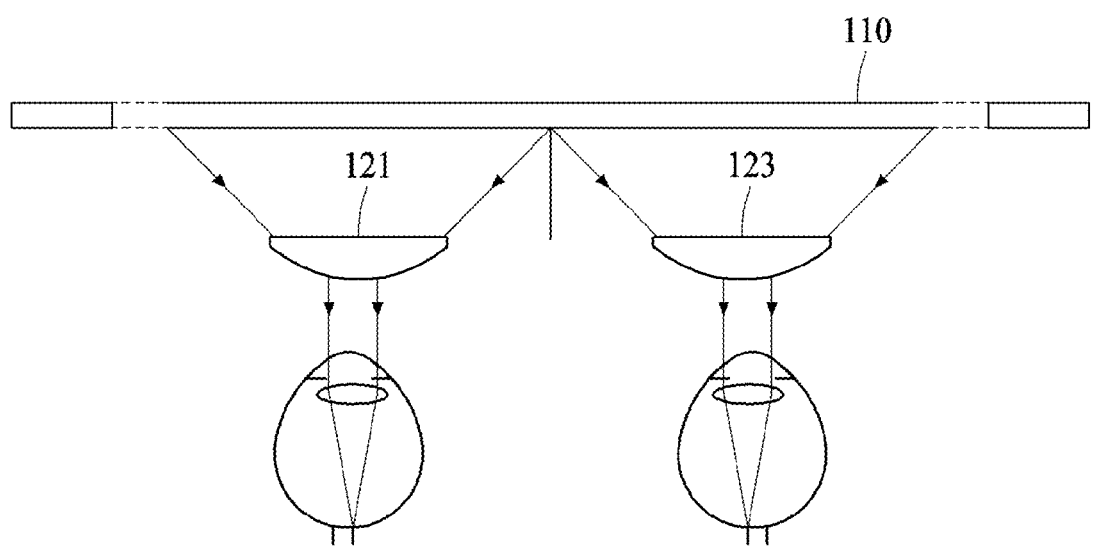
Figure 1C:
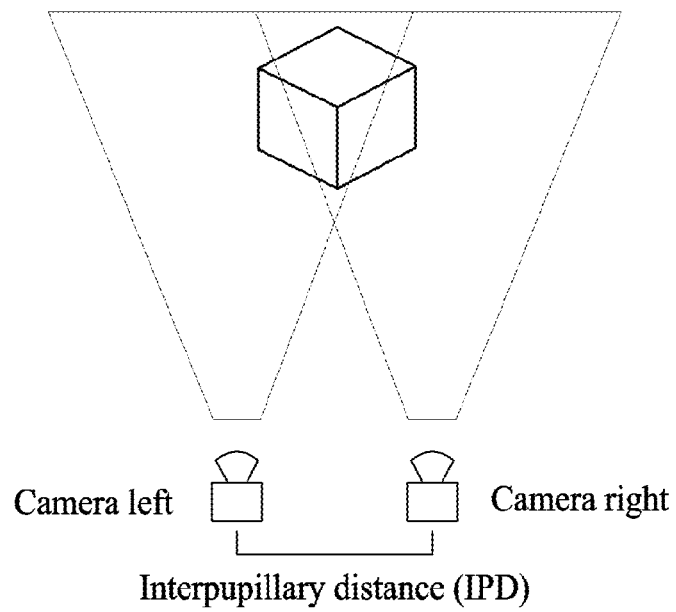
Figure 1C:
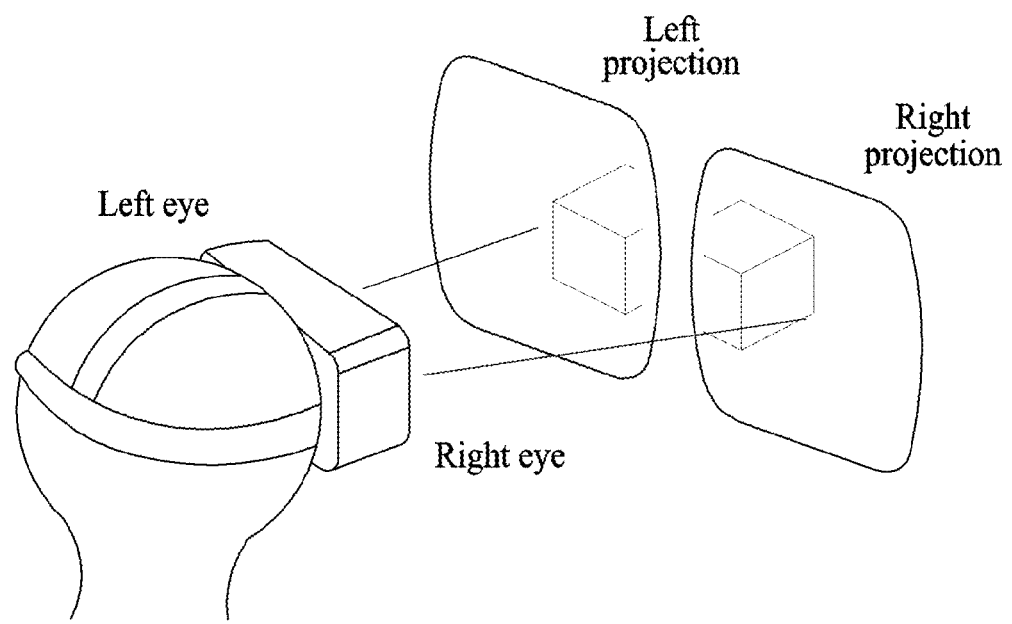

FIGS. 1A to 1C are views for providing an overview of image technology of a 3D personalized image providing apparatus using a stereo technique according to the related art.

Referring to FIG. 1A, stereoscopic three-dimensional (3D) imaging technology is a technology that allows a stereoscopic effect to be virtually sensed through a display using a parallax between a left eye and a right eye of a human.

Referring to FIG. 1B, a structure of a stereo HMD including a display 110 and lenses 121 and 123 are shown.

Referring to FIGS. 1B and 1C, the stereo head-mounted display imaging technology refers to a technique of displaying a virtual stereoscopic image by focusing the lenses on the user's eyes after displaying an image right in front of the user's eyes.

Figure 2:
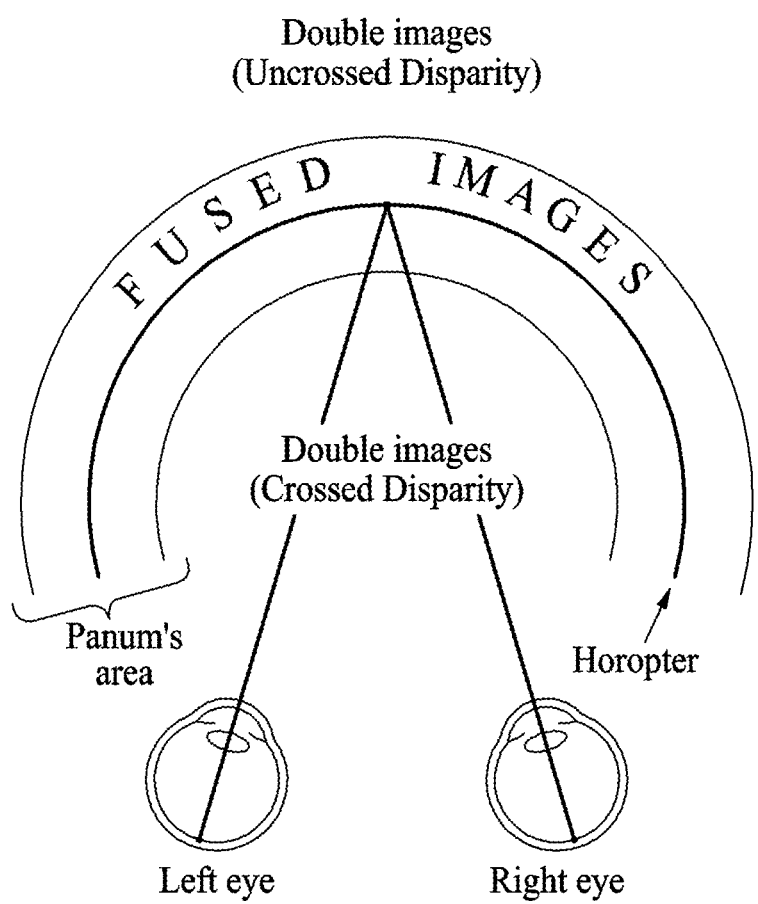
FIG. 2 shows the horopter and Panum's area of human eyes.

FIG. 2 shows the horopter and Panum's area of human eyes.

The horopter may be defined as the locus of points in space that have the same disparity as fixation. Here, an area in a certain range with respect to a curve formed by the horopter is referred to as Panum's area. An object located within Panum's area may be fused into a 3D image having a 3D effect even if the object slightly deviates from the corresponding points of the retinas of both eyes. Therefore, if an image is located outside Panum's area, the image is not fused into 3D. Thereby, double vision occurs or the image is out of focus.

Figure 3:
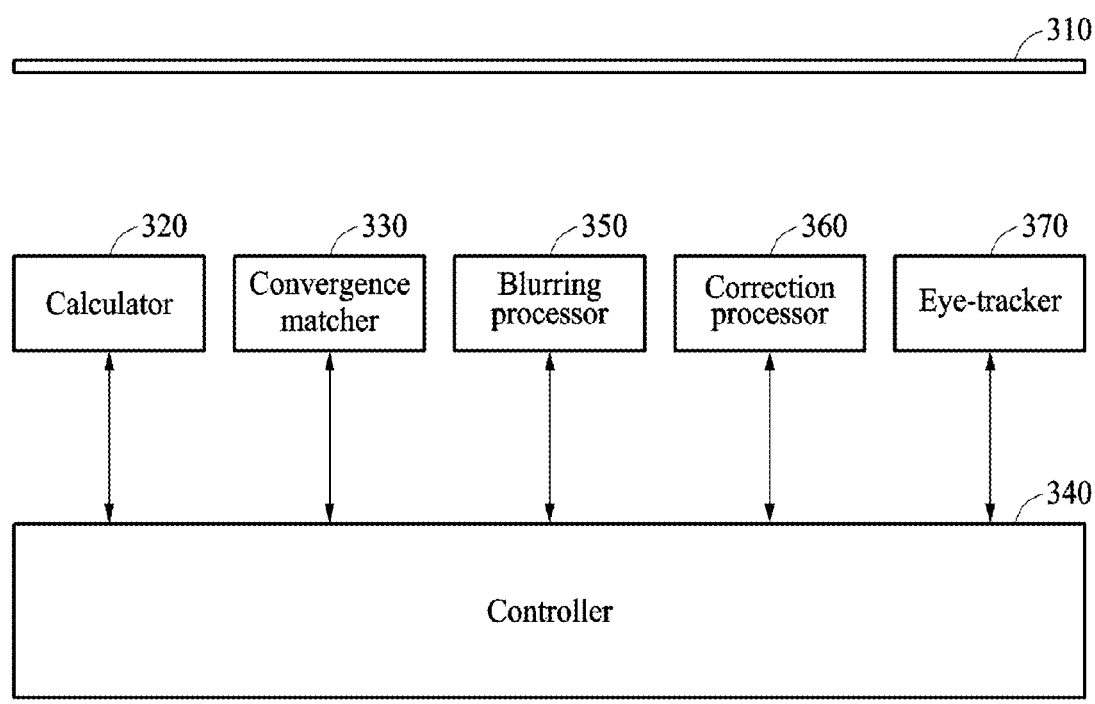
FIG. 3 is a block diagram of a personalized 3D image providing apparatus using a convergence matching algorithm according to an embodiment of the present invention.

FIG. 3 is a block diagram of a personalized 3D image providing apparatus using a convergence matching algorithm according to an embodiment of the present invention.

Referring to FIG. 3, a personalized 3D image providing apparatus using a convergence matching algorithm includes a screen 310, a calculating unit 320, a convergence matching unit 330, and a controller 340. The personalized 3D image providing apparatus may further include a blurring processor 330, a correction processor 360, and an eye-tracking unit 370.

The screen 310 is fixed to one area of the personalized 3D image providing apparatus and is set to a horopter region. A distance between user's eye to the screen 310 is fixed to predefined value.

Figure 5:
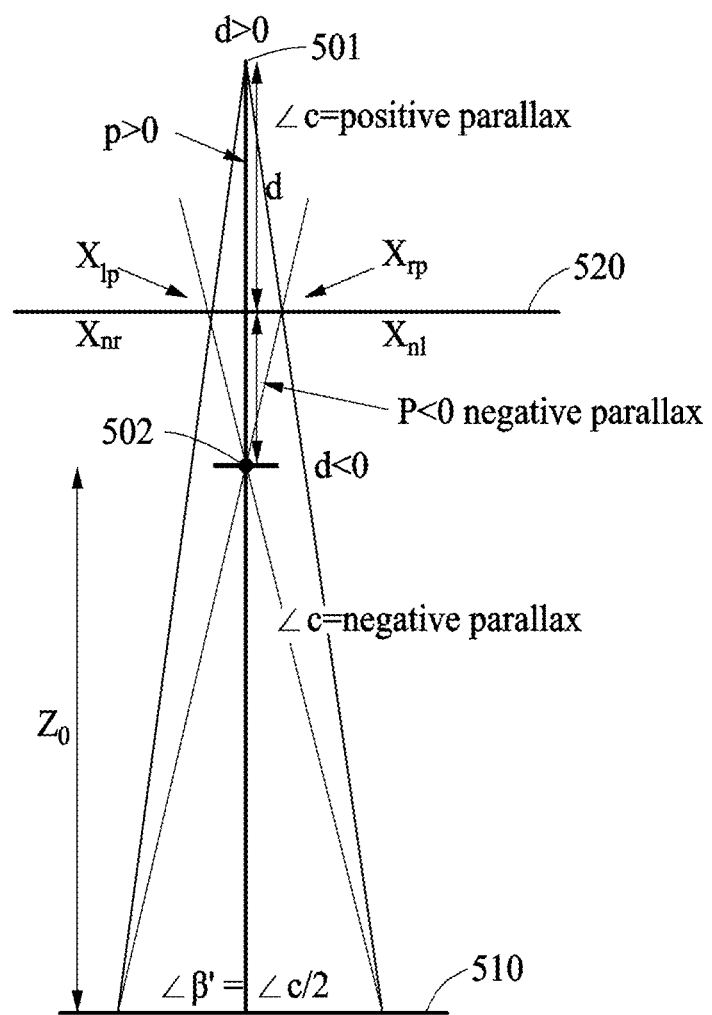
FIG. 5 is an exemplary diagram illustrating the relationship between screen disparity and parallax.

For example, predefined value may be a distance from the user's eyes to the screen as denoted by 510 and 520 in FIG. 5.

In this case, the horopter region is an area obtained by modeling the human eye horopter having a form of a curve into a straight line having a predetermined distance from the human eye.

As described in FIG. 2, the horopter, formed by matching of accommodation and convergence in real human eyes, is measured as a nonlinear curve. However, the personalized 3D image providing apparatus according to an embodiment of the present invention models the horopter as a straight line spaced a certain distance from the eyes.

In the case of a 3D TV or a 3D movie, it is technically impossible for a 3D imaging apparatus to satisfy all conditions for accommodation-convergence matching because the TV or movie is viewed by multiple viewers simultaneously or the distance between the viewer's eyes and the screen varies.

On the other hand, the head-mounted display (or helmet-mounted display, HMD) or the head-worn display (HWD) can employ the convergence matching algorithm of the present invention since the distance between the viewer's eyes and the screen can be fixed.

The calculation unit 320 calculates a shift value of an image projected onto the screen 310 based on the distance from a virtual stereo camera to a target object.

The calculation unit 330 calculates a screen disparity value d formed on the screen by the virtual stereo camera and the target object. The calculation unit 330 may compute a positive shift value if the depth value of the target object is greater than a screen distance, and may compute a negative shift value if the depth value of the target object is less than the screen distance.

Figure 11:
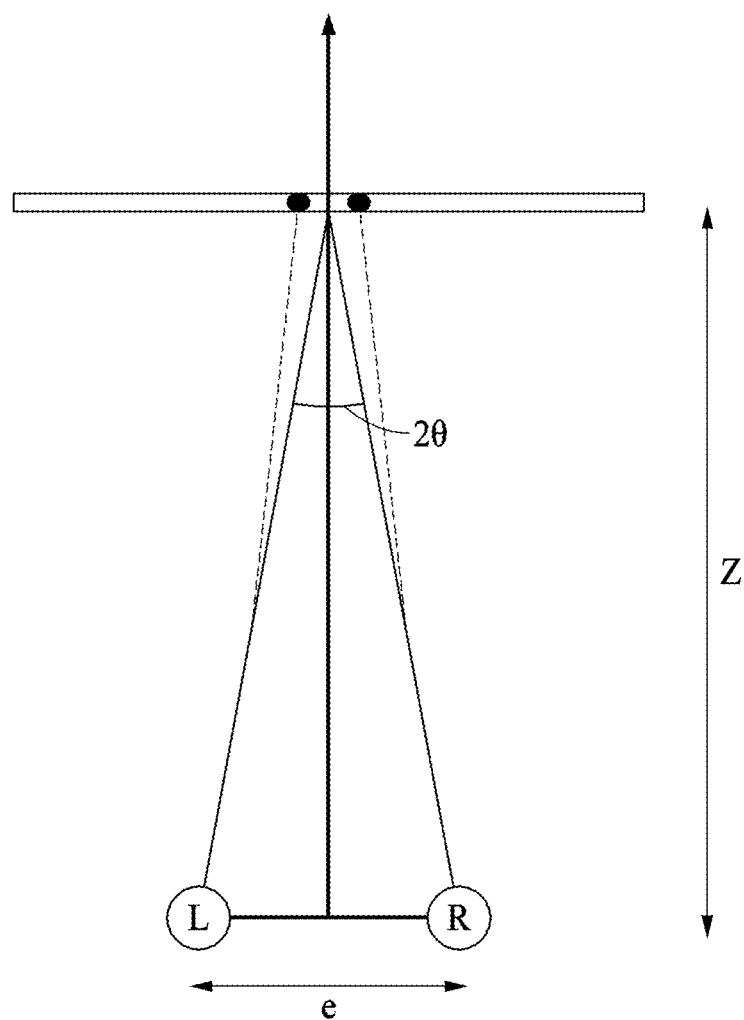
FIGS. 11 to 13 are exemplary diagrams illustrating convergence matching according to an embodiment.
Figure 12:
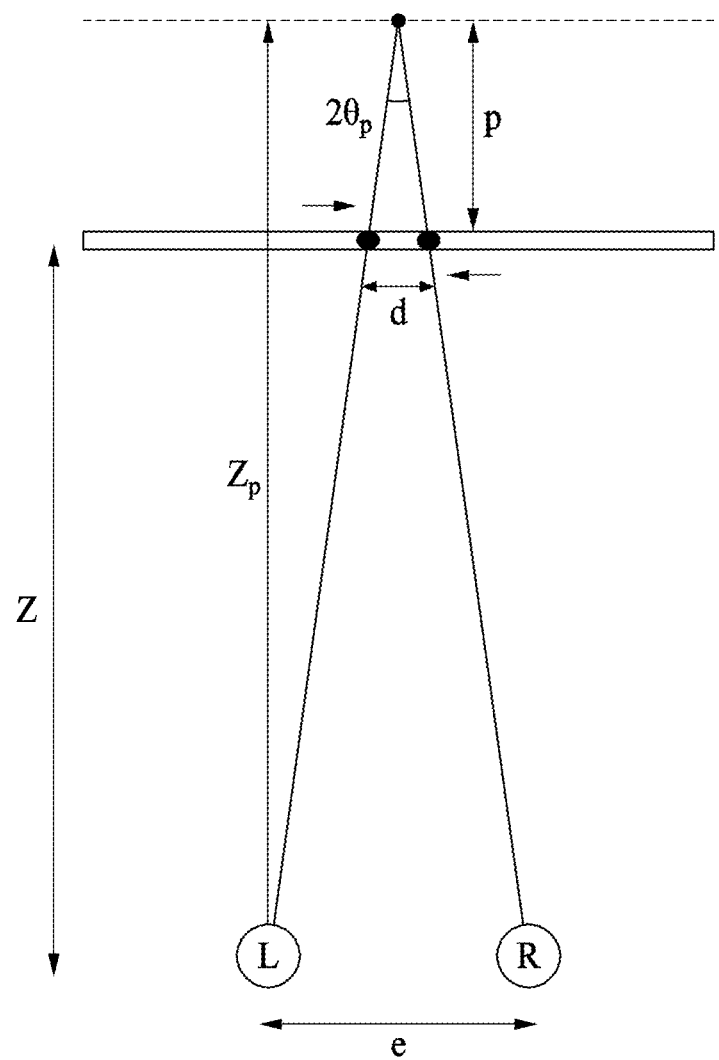
Figure 13:
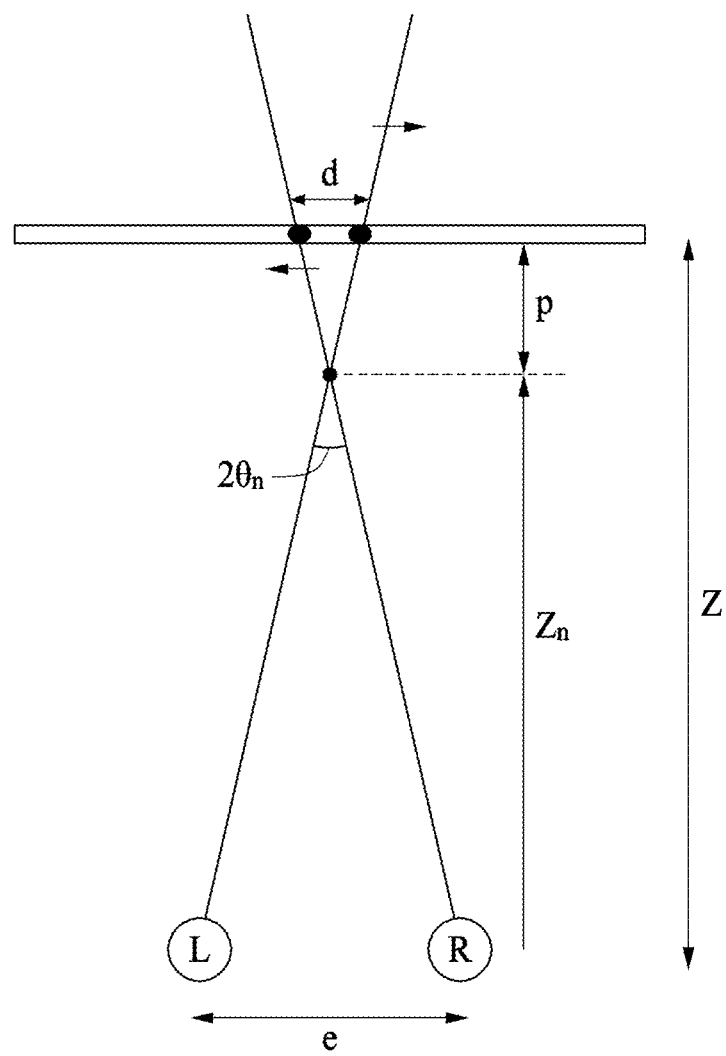

Here, the screen distance may be "Z" in FIGS. 11 to 13.

In this case, the positive shift value may be d/2 and the negative shift value may be −d/2.

The method of calculating a screen disparity value and the method of calculating a shift value will be described in more detail with reference to FIGS. 5, 6, and 11 to 13.

The convergence matching unit 330 performs a function of matching the convergence angle to the horopter region based on the shift value.

The controller 340 controls the convergence matching unit 330 to maintain the convergence angle when the user's gaze is shifted to a nearby object having the same depth value as the target object.

The blurring processor 330 sets a range within a predetermined distance from the horopter region as Panum's area and performs the blurring operation on the focus of an area outside Panum's area.

The correction processor 360 may calculate the focal length of the target object from the virtual stereo camera and the object distance from the virtual stereo camera to the target object, and correct the perspective and the focus within the content for 3D display using the focal length and the object distance.

The correction processor 360 may perform blurring on fields other than a zone of interest, process instantaneous matching of the convergence angle of the user's eyes and the camera angle, and perform additional adjustment of the camera position according to the distance of the target object, thereby preventing dizziness caused by mismatching.

First, the correction processor 360 may perform blurring on the focus of other objects positioned outside the interesting zone calculated by the calculated focal length or the background of the screen.

To this end, the correction processor 360 may calculate the intersection between the focal lengths from the stereo camera, and calculate the Depth of Field (DoF) for an object of interest based on the calculated intersection. In addition, the correction processor 360 may perform blurring of the target object spaced apart from the calculated depth of field (DoF) by a predetermined distance or more or the background. In other words, the depth of field (DoF) may be interpreted as the depth of a subject, and by blurring the area deviated from the depth of the subject, an image may be realistically displayed. Thereby, mismatch between the actual view and the image on the screen may be reduced, and thus dizziness felt by a person watching a 3D video may be lessened.

Next, the correction processor 360 may orient the stereo camera in a direction corresponding to the position of the target object. That is, the processor 120 may prevent dizziness by orienting the stereo camera toward the target object in the current content.

For example, the correction processor 360 may adjust orientation of the stereo camera directed toward the focal point of a fixed object in real time, using the calculated depth of field (DoF) and the calculated object distance.

The eye-tracking unit 370 calculates 3D coordinates using eye information acquired by eye-tracking the user, and extracts a focal length of the eyes corresponding to the 3D coordinates.

Then, the controller 340 may calculate a shift value based on the focal length of the eyes corresponding to the 3D coordinates. For example, the focal length of the eyes corresponding to the 3D coordinates may be a distance from the user's eyes to an object as denoted by 501 and 502 in FIG. 5.

When the user's gaze is shifted to an object having a depth value different from the depth value of the target object, the controller 340 may determine whether to maintain the convergence angle based on the attributes of the object.

For example, when the user's gaze is shifted from a first object to a second object having a depth value different from that of the first object, a computational operation for changing the convergence angle may not be performed if the attribute of the second object is set to indicate that the user's gaze is expected to stay on the second objected for an extremely short time.

The eye-tracking unit 370 may acquire the two-dimensional coordinates on the screen monitored by the user through eye-tracking of the user as the eye information, and extract the focal length by calculating the distance between the calculated two-dimensional coordinate value and the virtual camera.

The eye-tracking unit 370 may calculate 3D coordinates by tracking the pupils of the user. More specifically, the eye-tracking unit 370 may preferentially acquire the two-dimensional coordinates on the screen monitored by the user from the result of eye tracking for the user's pupils. In this case, the acquired two-dimensional coordinates may be interpreted as eye information.

Figure 4A:
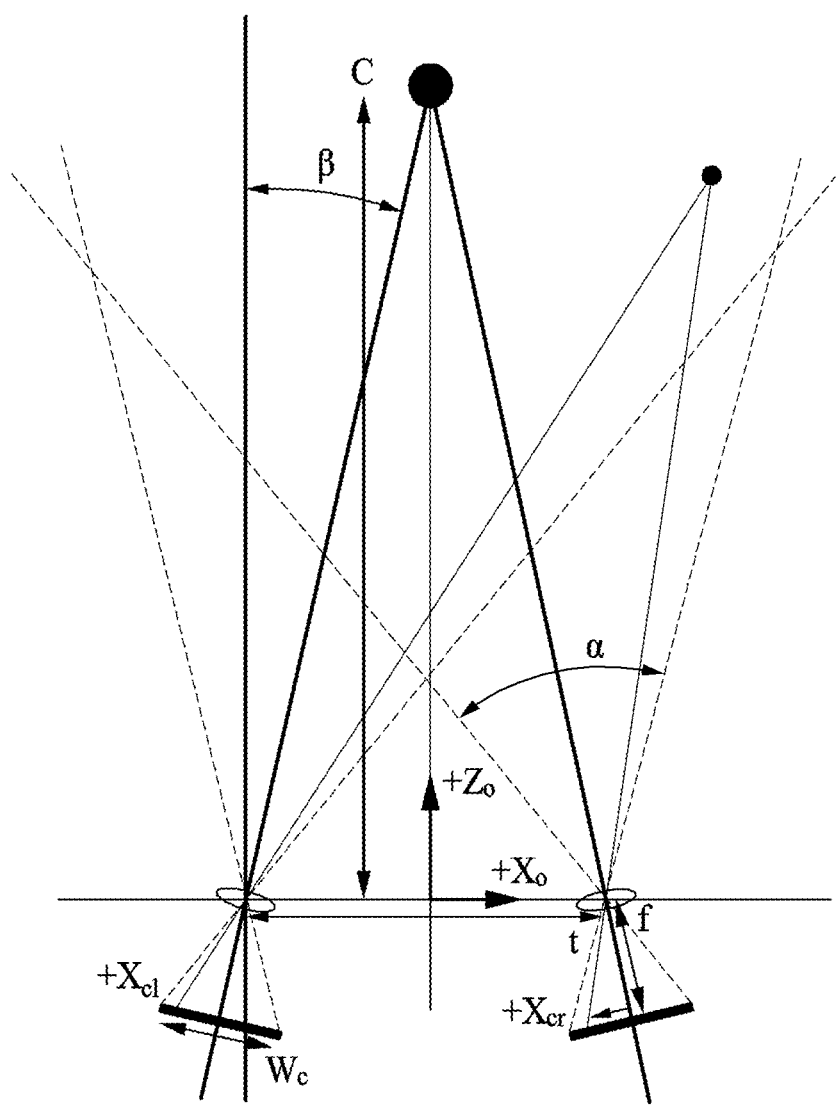
FIG. 4A shows an example of performing convergence-accommodation matching by adjusting the toe-in angle of a stereo camera.

FIG. 4A shows an example of performing convergence-accommodation matching by adjusting the toe-in angle of a stereo camera.

Referring to FIG. 4A, the angle β is a toe-in angle of the camera, the convergence angle C is 2, and it can be seen that accommodation matching is performed at a fixed point by adjusting the angles of the lenses of the stereo camera.

Here, the angles of the lenses of the stereo camera may be adjusted within a range of α.

Figure 4B:
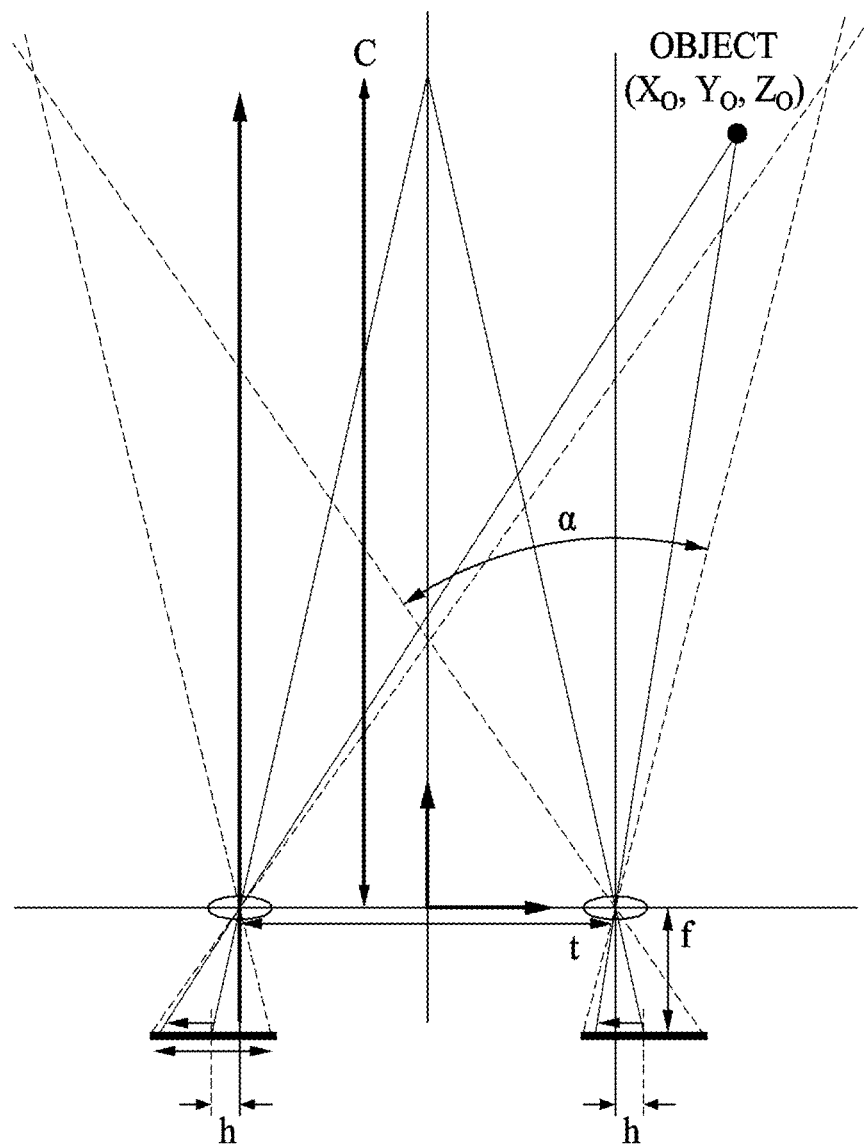
FIG. 4B shows an example of convergence-accommodation matching using a pixel shift.

FIG. 4B shows an example of convergence-accommodation matching using a pixel shift.

Referring to FIG. 4B, the toe-in angle of the camera is 0 in contrast to FIG. 4A, and it can be seen that convergence matching can be performed by shifting both lenses of the stereo camera by h in a lateral direction.

FIG. 5 is an exemplary diagram illustrating the relationship between screen disparity and parallax.

Referring to FIG. 5, when a separation distance of the stereo camera is t, if an object 501 is positioned at a distance from the X-axis 510 connecting both cameras longer than the distance to a preset straight line 520, a positive parallax will be given. If the object 502 is positioned at a distance shorter than the distance to the preset straight line 520, a negative parallax will be given.

A distance between two points at which lines connecting the left and right lenses and the object cross the preset straight line 520 may be referred to as disparity.

The depth value of the object 502 may be denoted by $Z_0$, the object 502 shown in the figure is in negative parallax. In this case, d may be "less than 0", and the distance P between the object 502 and the preset straight line 520 may be "less than 0".

When it is assumed that the preset straight line 520 represents the screen of a personalized 3D image providing apparatus, a shift value for performing convergence matching may be calculated.

Referring to FIG. 5, the positions of the image points on the left and right image sensors may be calculated by Equations 1 and 2 given below.

$$X_{cl} = f\tan\left[\arctan\left(\frac{t+2X_0}{2Z_0}\right) - \beta\right] - h \quad \text{Equation 1}$$

$$X_{cr} = -f\tan\left[\arctan\left(\frac{t-2X_0}{2Z_0}\right) - \beta\right] + h \quad \text{Equation 2}$$

Here, $Z_0$ may denote the distance from the center of both cameras to the object, $X_{cl}$ may denote the position of an image point of the left camera of the stereo camera, $X_{cr}$ may denote the position of an image point of the right camera of the stereo camera, $X_0$ may denote half the distance between the left and right cameras, $\beta$ may denote the angle formed by the line connecting the left and right cameras and the object, and h may denote a shift value.

For parallel arrangement of the stereo cameras (i.e., $\beta$=0), the disparity may be defined as d=Xr−Xl, where d may be defined as d=Xr−Xl=2h−t/$Z_0$.

Thus, the disparity may be 0 and $Z_0$ may be $Z_0$=t/(2h).

The convergence distance of the 3D version system or the stereo camera may be controlled by adjusting the image plane shift value h and the distance t between the left and right cameras.

When the shift value h is calculated, the pixel value may be adjusted such that the distance between the right and left images is increased by h in negative parallax, and is decreased by h in positive parallax.

Therefore, the positive shift value may represent a case in which the depth value of the object is greater than that of the screen, and the negative shift value may represent a case in which the depth value of the target object is less than that of the screen.

Figure 6:
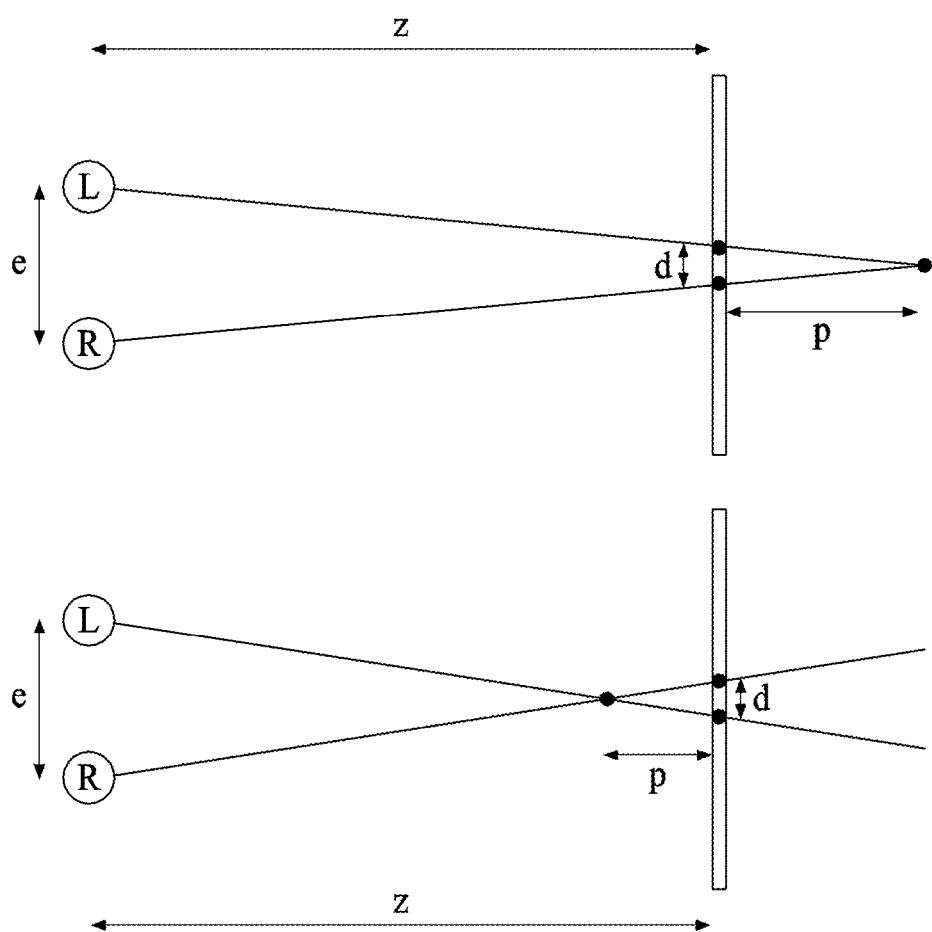
FIG. 6 is another exemplary diagram illustrating the relationship between screen disparity and parallax.

FIG. 6 is another exemplary diagram illustrating the relationship between screen disparity and parallax.

Referring to FIG. 6, the distance between both eyes of the user may be defined as e. The upper diagram of FIG. 6 illustrates positive parallax, and the lower diagram of FIG. 6 illustrates negative parallax.

In FIG. 6, Z denotes the distance from the user's eyes to the fixed screen.

Here, p denotes a perceived depth, z denotes a viewing distance, e denotes eye separation, and d denotes screen disparity.

d is based on the perceived depths before and after the display plane and may be calculated from Equation 3 below.

$$d = x_r - x_l \quad \text{Equation 3}$$

Here, $x_r$ means the right image and $x_l$ means the left image.

The perceived depth behind the screen plane may be calculated from Equation 4 below using positive values of d.

$$p = \frac{z}{\left(\frac{e}{|d|}\right) - 1} = z|d|/(e - |d|) \quad \text{Equation 4}$$

Further, the perceived depth at the front of the screen plane may be calculated from Equation 5 below using negative values of d.

$$p = \frac{z}{\left(\frac{e}{|d|}\right) + 1} = z|d|/(e + |d|) \quad \text{Equation 5}$$

Figure 7:
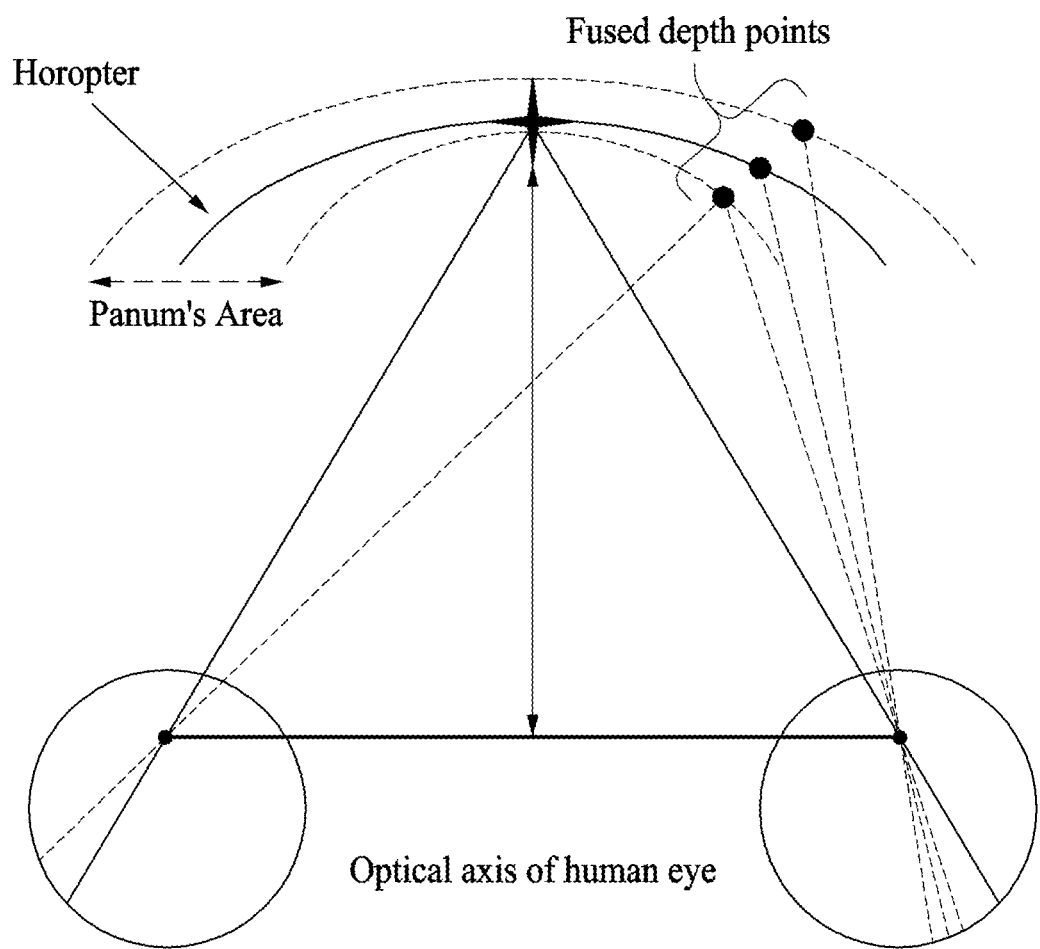
FIG. 7 is an exemplary diagram illustrating a horopter region of a typical human eye system.
Figure 8:
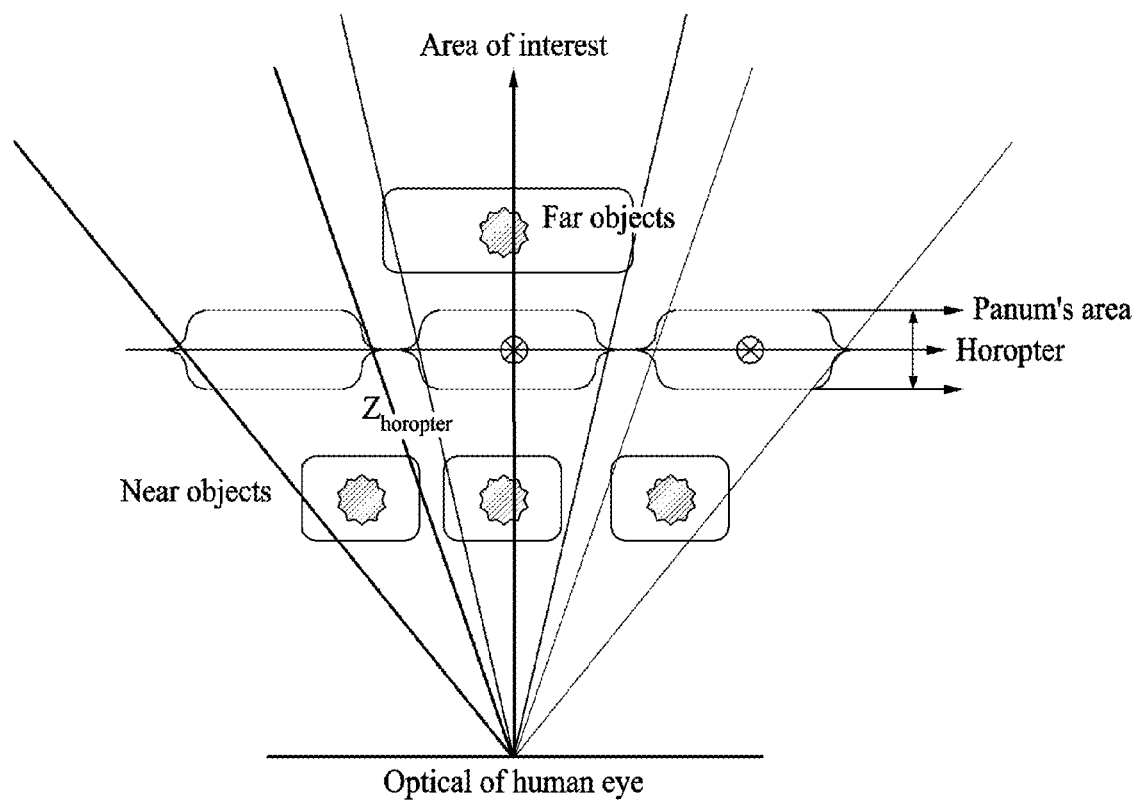
FIG. 8 is an exemplary diagram illustrating horopter region modeling according to an embodiment of the present invention.

FIG. 7 is an exemplary diagram illustrating a horopter region of a typical human eye system, and FIG. 8 is an exemplary diagram illustrating horopter region modeling according to an embodiment of the present invention.

As described with reference to FIG. 2, the human eye system may include the horopter and Panum's area. The horopter may be defined as a curve connecting points at which the focal length and the convergence angle of the eyes are formed. Here, an area in a certain range with respect to the curve formed by the horopter is referred to as Panum's area.

As shown in FIG. 8, a personalized 3D image providing apparatus according to an embodiment of the present invention models the horopter as a straight line spaced a certain distance from the eyes.

When a target object moves within Panum's area, the clear zone moves. When the target object moves across Panum's area, Zhoropter may be reset.

Figure 9:
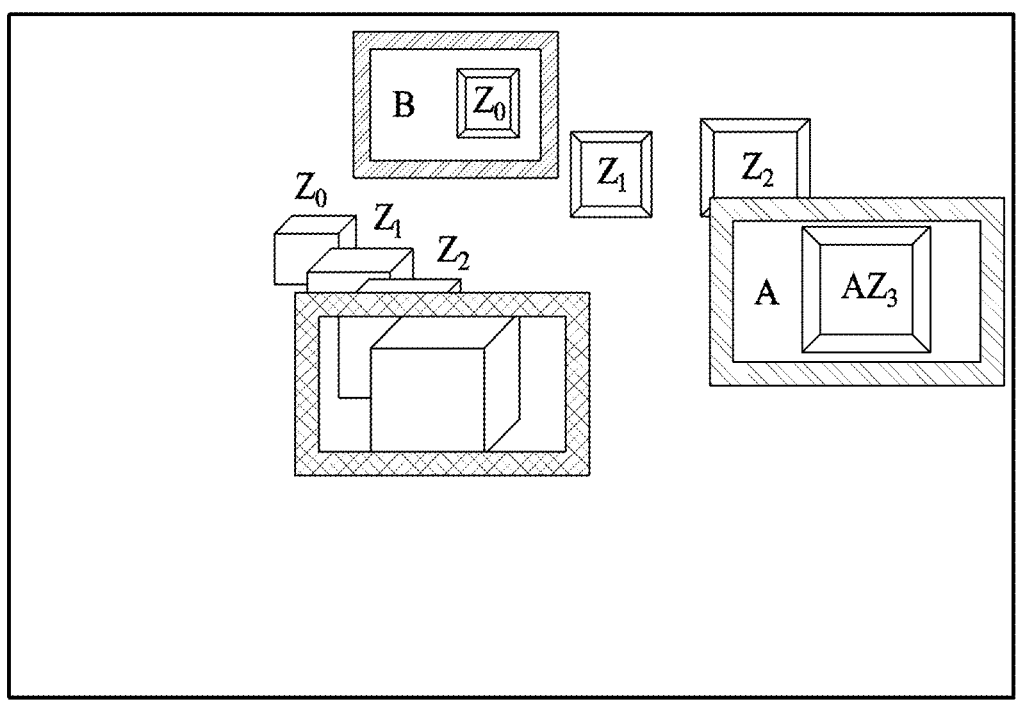
FIG. 9 is an exemplary diagram illustrating convergence matching according to the user's eyes in a personalized 3D image providing apparatus according to an embodiment of the present invention.

FIG. 9 is an exemplary diagram illustrating convergence matching according to the user's eyes in a personalized 3D image providing apparatus according to an embodiment of the present invention.

Referring to FIG. 9, a plurality of target objects is located on the x, y, and z axes, and z is positioned at the distance coordinates of the object.

According to an embodiment, when the eyes are fixed on a cube Z3, the gaze of the eyes is shifted to another object AZ3 at the same depth in the clear zone, without resetting the disparity. Thereafter, if the gaze of the eyes is shifted to depth B of Z0, rearrangement of convergence may be performed through adjustment of h or t.

The horopter formed by matching of accommodation and convergence in the real human eyes is measured as a nonlinear curve. In the present invention, the horopter is modeled as a straight line spaced a certain distance from the eyes. Thereby, calculation may be simplified while obtaining accommodation and convergence closely matching that of actual eyes.

In addition, the visual fatigue reduction technique using the convergence matching algorithm according to an embodiment of the present invention corrects the perspective and the focus within the content for the wearable VR HMD (virtual reality head-mounted display) using the calculated focal length and target object distance. However, the technology of the present invention is not limited to the content for the wearable VR HMD and can also be applied to a general 3D content display taking the form of a stereo display as a basic constituent. For example, the present invention can be applied to production and display of content of 3D images using polarized glasses or electronic shutter glasses.

The visual fatigue reduction technique using the convergence matching algorithm according to an embodiment may perform blurring on fields other than the zone of interest, process instantaneous matching of the convergence angle of the user's eyes and the camera angle, and perform additional adjustment of the camera position according to the distance of the target object, thereby preventing dizziness caused by mismatching.

First, the visual fatigue reduction technique using the convergence matching algorithm according to an embodiment may perform blurring on the focus of other objects positioned outside the zone of interest calculated by the calculated focal length or the background of the screen.

To this end, the visual fatigue reduction technique using the convergence matching algorithm according to an embodiment may calculate the intersection between the focal lengths from the stereo camera, and calculate the Depth of Field (DoF) for an object of interest based on the calculated intersection. In addition, the visual fatigue reduction technique using the convergence matching algorithm according to an embodiment may perform blurring on the target object spaced apart from the calculated depth of field (DoF) by a predetermined distance or more or the background. In other words, the depth of field (DoF) may be interpreted as the depth of a subject, and by blurring the area deviated from the depth of the subject, an image may be realistically displayed. Thereby, mismatch between the actual view and the image on the screen may be reduced, and thus dizziness felt by a person watching a 3D video may be lessened.

In addition, the visual fatigue reduction technique using the convergence matching algorithm according to an embodiment may orient the stereo camera in a direction corresponding to the position of the target object. That is, the visual fatigue reduction technique may prevent dizziness by orienting the stereo camera toward the target object in the current content. For example, the visual fatigue reduction technique using a convergence matching algorithm according to an embodiment may adjust orientation of the stereo camera directed toward the focal point of a fixed object in real time, using the calculated DoF and the calculated object distance.

In addition, the visual fatigue reduction technique using the convergence matching algorithm according to an embodiment may adjust the IPD of the stereo camera based on the object distance.

In addition, the visual fatigue reduction technique using the convergence matching algorithm according to an embodiment may calculate an intersection of predetermined focal lengths from two cameras, and use parameters (focal length, etc.) for DoF.

That is, the visual fatigue reduction technique using the convergence matching algorithm according to an embodiment may define a circle of interest (CoI) corresponding to the depth of field (DoF), calculate a circle of confusion (CoC) using the defined CoI, and define a bounded zone and parameter values for blurring according to the calculated CoC, and perform blurring.

The CoI represents a depth of field that is spaced a certain distance from a fixed object toward or away from the stereo camera. A target object positioned within the CoI may be focused and displayed clearly. When the target object is positioned on the stereo camera side, the stereo camera may be oriented toward the fixed object, thereby preventing mismatch, which causes dizziness.

In addition, the visual fatigue reduction technique using the convergence matching algorithm according to an embodiment may perform blurring on target objects having a DoF different from the DoF corresponding to the intersection, thereby prevent dizziness, which is caused by mismatch.

Figure 10:
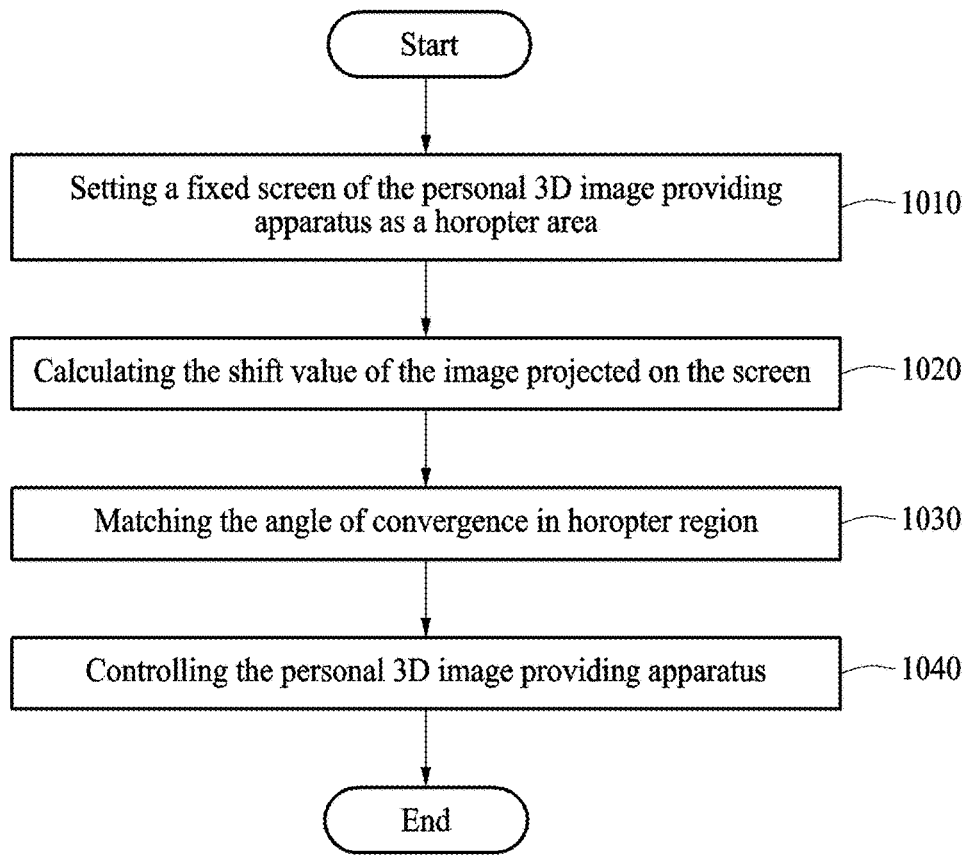
FIG. 10 is a flowchart illustrating a method for providing a personalized 3D image using a convergence matching algorithm according to an embodiment.

FIG. 10 is a flowchart illustrating a method for providing a personalized 3D image using a convergence matching algorithm according to an embodiment.

Referring to FIG. 10, in step 1010, the personalized 3D image providing apparatus sets a fixed screen of the personalized 3D image providing apparatus as a horopter region.

In step 1020, a shift value of an image projected onto the screen may be calculated based on the distance from the virtual stereo camera to the target object.

In step 1030, the convergence angle may be matched with the horopter region based on the shift value.

In step 1040, when the user's gaze is shifted to a nearby object having the same depth value as the target object, the personalized 3D image providing apparatus may be controlled to maintain the convergence angle.

The step of calculating the shift value may include calculating a screen disparity value d formed on the screen by the virtual stereo camera and the target object, comparing the depth value of the target object with the depth value of the screen, and calculating a positive shift value when the depth value of the target object is greater than the screen distance and calculating a negative shift value when the depth value of the target object is less than the screen distance.

FIGS. 11 to 13 are exemplary diagrams illustrating convergence matching according to an embodiment.

Referring to FIGS. 11 and 12, Z denotes the distance from the user's eyes or the virtual stereo camera to the fixed screen, and e denotes the distance between the cameras.

FIG. 11 illustrates a case where the disparity is 0, FIG. 12 illustrates a case of positive parallax, and FIG. 13 illustrates a case of negative parallax.

Referring to FIG. 12, $\tan(\theta_p)$ is equal to $0.5e/Z_p$, and d is equal to $ep/Z_p$. Therefore, a relationship of Equation 6 may be established.

$$d = ep/Zp = e(1-Z-Zp) \quad \text{Equation 6}$$

Referring to Equation 6, h may be calculated as 0.5d.

Referring to FIG. 13, $\tan(\theta_n)$ is $0.5e/Zn$, and d may be given by Equation 7 below.

$$d = ep/Zn = e|(1-Z-Zp)| \quad \text{Equation 7}$$

Therefore, h may be calculated as 0.5d.

In this case, h may be a positive shift value and expressed as 1/2 d in FIG. 12, and may be a negative shift value and be expressed as −1/2 d in FIG. 13.

According to an embodiment, a convergence matching algorithm suitable for a personalized three-dimensional image providing apparatus may be provided.

In addition, using the technique of visual fatigue reduction through the convergence matching algorithm that addresses the keystone effect, visual fatigue may be lessened through convergence matching in the VR HMD, and dizziness caused by visual fatigue may be addressed.

The aforementioned device may be realized by hardware component, a software component, and/or a combination of hardware and software components. For example, the device and components described in the embodiments may be realized using one or more general-purpose computers or special-purpose computers such as, for example, a processor, a controller, an arithmetic logic unit (ALU), a digital signal processor, a microcomputer, a field programmable array (FPA), a programmable logic unit (PLU), a microprocessor, or other devices implementing instructions and responding thereto. The processor may execute one or software applications that run on an operating system (OS). In addition, the processor may approach data, store, manipulate, and process the data, and generate new data by responding to running of software. Although one processor has been used to aid in understanding, those skilled in the art can understand that the processor may include a plurality of processing elements and/or a plurality of processing element types. For example, the processor may include a plurality of processors or a combination of one processor and controller. Further, another processing configuration, such as a parallel processor, may be applied.

Software may include a computer program, code, instructions, or a combination of one or more of the foregoing, and may configure a processing device to operate as desired or independently or collectively a command to a processing device. Software and/or data may be permanently or temporarily embodied in the form of any type of machines, components, physical devices, virtual equipment, computer storage media or devices, or a signal wave to be transmitted, so as to be interpreted by a processing device or to provide a command or date to a processing device. Software may be distributed over a networked computer system, and stored or executed in a distributed manner. Software and data may be stored on one or more computer readable media.

Embodiments of the present invention can include a computer readable medium including program commands for executing operations implemented through various computers. The computer readable medium can store program commands, data files, data structures or combinations thereof. The program commands recorded in the medium may be specially designed and configured for the present invention or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include a machine language code created by a compiler and a high-level language code executable by a computer using an interpreter and the like. The hardware devices may be configured to operate as one or more software modules to perform operations in the embodiments, and vice versa.

Although exemplary embodiments of the present invention have been disclosed for illustrative purposes, those skilled in the art will appreciate that various modifications, additions and substitutions are possible, without departing from the scope and spirit of the invention as disclosed in the accompanying claims. For example, proper result may be achieved even if the techniques described above are implemented in an order different from that for the disclosed method, and/or disclosed constituents such as a system, structure, device and circuit are coupled to or combined with each other in a form different from that for the disclosed method or replaced by other constituents or equivalents.

It should be understood, however, that there is no intent to limit the invention to the embodiments disclosed, rather, the invention is to cover all modifications, equivalents, and alternatives falling within the spirit and scope of the invention as defined by the claims.

What is claimed is:

1. An apparatus for providing a personalized three-dimensional image using convergence matching, the apparatus comprising:
   a fixed screen set as a horopter region;
   an eye-tracking unit configured to calculate three-dimensional coordinates using eye information acquired by eye-tracking a user and extract an eye focal length corresponding to the three-dimensional coordinates;
   a calculation unit configured to calculate a shift value of an image projected onto the screen based on a distance from a center of a virtual stereo camera to a target object;
   a convergence matching unit configured to match a convergence angle to the horopter region based on the shift value;
   a blurring processor configured to set a range within a predetermined distance from the horopter region as Panum's area and perform blurring on a focus of an area outside the Panum's area; and
   a controller configured to control the convergence matching unit to maintain the convergence angle when the user's gaze is shifted to a nearby object having the same depth value as the distance from the center of the virtual stereo camera to the target object.

2. The apparatus according to claim 1, wherein the calculation unit calculates a screen disparity value d formed on the screen by the virtual stereo camera and the target object, and calculates a positive shift value when a depth value of the target object is greater than a depth value of the screen, and a negative shift value when the depth value of the target object is less than the depth value of the screen.

3. The apparatus according to claim 2, wherein the positive shift value is d/2, and the negative shift value is −d/2.

4. The apparatus according to claim 1, wherein the horopter region is obtained by modeling a human eye horopter having a form of a curve into a straight line having a predetermined distance from human eyes.

5. The apparatus according to claim 1, further comprising:
   a correction processor configured to calculate a focal length from the virtual stereo camera to the target object and an object distance from the virtual stereo camera to the target object, and correct a perspective and a focus within content for three-dimensional display using the focal length and the object distance.

6. The apparatus according to claim 1,
   wherein the controller controls the calculation unit to calculate the shift value based on the eye focal length.

7. The apparatus according to claim 4, wherein the eye-tracking unit acquires, as the eye information, a two-dimensional coordinate on the screen monitored by the user through eye-tracking of the user, and extracts the eye focal length by calculating a distance between a calculated value of the two-dimensional coordinate and the virtual stereo camera.

8. The apparatus according to claim 4, wherein, when the user's gaze is shifted to an object having a depth value different from the depth value of the target object, the controller controls determines whether to maintain the convergence angle based on an attribute of the object.

9. A method of providing a personalized three-dimensional image using convergence matching, the method comprising:

setting a fixed screen of a personalized three-dimensional image providing apparatus as a horopter region;

calculating three-dimensional coordinates using eye information acquired by eye-tracking a user and extract an eye focal length corresponding to the three-dimensional coordinates;

calculating a shift value of an image projected onto the screen based on a distance from a center of a virtual stereo camera to a target object;

matching a convergence angle to the horopter region based on the shift value;

setting a range within a predetermined distance from the horopter region as Panum's area and performing blurring on a focus of an area outside the Panum's area; and controlling the personalized three-dimensional image providing apparatus to maintain the convergence angle when the user's gaze is shifted to a nearby object having the same depth value as the distance from the center of the virtual stereo camera to the target object.

10. The method according to claim 9, wherein the calculating of the shift value comprises:

calculating a screen disparity value d formed on the screen by the virtual stereo camera and the target object;

comparing the depth value of the target object with a depth value of the screen; and calculating a positive shift value when the depth value of the target object is greater than the depth value of the screen, and a negative shift value when the depth value of the target object is less than the depth value of the screen.

11. The method according to claim 10, wherein the positive shift value is $d/2$, and the negative shift value is $-d/2$.

12. The method according to claim 9, wherein the horopter region is obtained by modeling a human eye horopter having a curve characteristic into a straight line having a predetermined distance from human eyes.

* * * * *